United States Patent [19]
Hamada et al.

[11] 4,153,344
[45] May 8, 1979

[54] LEAD-IN ELECTRODE STRUCTURE FOR ELECTROCHROMIC DISPLAYS OF THE SEGMENTED TYPE

[75] Inventors: Hiroshi Hamada, Tenri; Hiroshi Nakauchi, Nara; Tadanori Hishida, Kashihara; Kozo Yano, Tenri, all of Japan

[73] Assignee: Sharp Kabushiki Kaisha, Osaka, Japan

[21] Appl. No.: 815,262

[22] Filed: Jul. 13, 1977

[30] Foreign Application Priority Data

Jul. 16, 1976 [JP] Japan ................... 51-85430

[51] Int. Cl.² ........................................... G02F 1/17
[52] U.S. Cl. .............................................. 350/357
[58] Field of Search .......... 350/357, 353, 363, 355, 350/356

[56] References Cited

U.S. PATENT DOCUMENTS 4,086,003  4/1978  Kouchi et al. .................. 350/357

*Primary Examiner*—Stanley D. Miller, Jr.
*Assistant Examiner*—James W. Davie
*Attorney, Agent, or Firm*—Birch, Stewart, Kolasch & Birch

[57] ABSTRACT

An electro-optical display comprises an electrochromic material and a predetermined number of display segments, each combination of the display segments defining a different desired display pattern. Lead-in electrodes connected to the respective display segments for driving purposes are shaped in such a manner as to have resistance values inversely proportional to the size of the corresponding display segments.

3 Claims, 8 Drawing Figures

LEAD-IN ELECTRODE STRUCTURE FOR ELECTROCHROMIC DISPLAYS OF THE SEGMENTED TYPE

BACKGROUND AND SUMMARY OF THE INVENTION

The present invention relates to an electro-optical display containing an electrochromic material held in two electrode carrying support plates to manifest reversible variations in the light absorption properties upon application of properly controlled voltage or current. This display is referred to as an "electrochromic display (ECD)" hereinafter.

The present invention relates, more particularly, to lead-in electrode structures connected to segment electrodes in the electrochromic display (ECD) of the segmented type.

A scheme of ECD is as follows. There are two types of electrochromic displays. The first type of ECD utilizes an electrically-induced chemical reduction of a colorless liquid to produce a colored, insoluble film on a cathode surface. In the second type of ECD, the color variation is produced by the change in the opacity of an inorganic solid film formed on electrodes.

A typical colorless liquid suited for the first type of ECD is an aqueous solution of the conducting salt, KBr and an electrochromic material, viologen, which produces a purplish film upon electrochemical reduction. See, for example, C. J. Shoot et al, Appl. Phys. Lett. 23 64 (1973).

The inorganic film used in the second type of ECD is the film of the transition metal oxide material such as tungsten oxide ($WO_3$). Such a film cooperates with an electrolyte. A typical system of the second type ECD is disclosed in B. W. Faughnan et al, RCA Review 36 177 (1975).

In the above-mentioned types of ECD, a very large current flows through the cell. Therefore, a considerably large voltage reduction occurs upon current flow through the cell at lead-in electrodes connected to segment electrodes. This will create variations of the degree of the coloration among the respective segment electrodes.

Accordingly, an object of the present invention is to enhance the visibility in an electrochromic display of the segmented type.

Another object of the present invention is to stabilize the degree of the coloration of respective display segments included within an electrochromic display of the segmented type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, lead-in electrodes connected to the respective display segments are shaped in such a manner as to have resistance values inversely proportional to the size of the corresponding display segments. Accordingly, the voltage reductions at the respective display segments are identical with each other even though the sizes of the respective display segments are different from each other.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, basic structures of the ECD, typical driver circuits for ECD, and typical layouts of a display pattern will be first described with reference to FIGS. 1 through 6.

Figure 1:
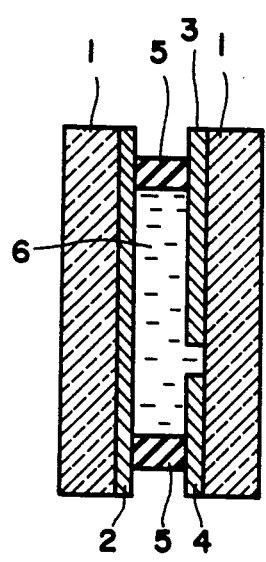
FIG. 1 is a cross-sectional view of a basic structure of a liquid state ECD.

FIG. 1 shows a basic structure of a liquid state ECD, which utilizes an electrically-induced chemical reduction of a colorless liquid to produce a colored, insoluble film on an electrode surface. The liquid state ECD mainly comprises glass substrates 1, display electrodes 2, a counter electrode 3, a reference electrode 4, a spacer 5, and an electrochromic material mixture liquid 6. When the display electrode 2 is held at a potential lower than a predetermined level (a threshold level), the following reaction is conducted to produce a purplish film on the display electrode 2.

(transparent)

(purplish)

where

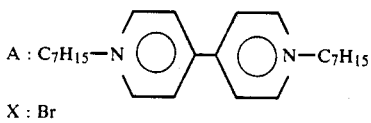

X : Br

The colored condition is maintained for several hours through several days after the above-mentioned potential is removed as long as the display electrode 2 is electrically separated from the driver circuit (memory effects). Conversely, when the colored display electrode 2 is held at a potential higher than the threshold level, the reaction is conducted inversely so that the colored film is oxidized to be dissolved into the transparent electrochromic material mixture liquid 6.

Figure 2:
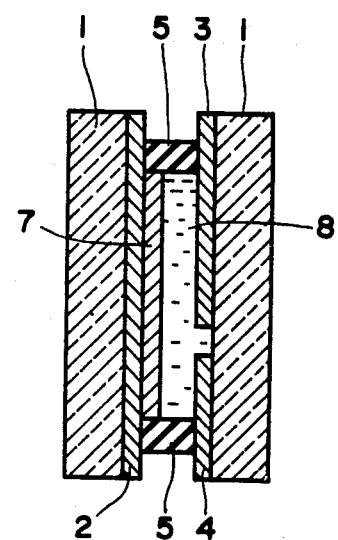
FIG. 2 is a cross-sectional view of a basic structure of a solid state ECD.

FIG. 2 shows a basic structure of a solid state ECD, wherein the color variation is produced by the change in the opacity of an inorganic solid film such as a transition metal oxide film attached to display electrodes. Like elements corresponding to those of FIG. 1 are indicated by like numerals.

An electrochromic material film 7 is attached to the display electrode 2, said film 7 being kept in contact with an electrolyte 8. The coloration operation and the memory function are similar to that of the liquid state ECD of FIG. 1. When a film of tungsten oxide ($WO_3$) is employed, the film 7 is colored blue.

The coloration operation is explained below.

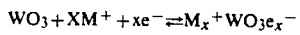

$$WO_3 + XM^+ + xe^- \rightleftharpoons M_x^+ WO_3 e_x^-$$

where $$M^+: H^+, Li^+, Na^+, K^+, etc.$$

The $WO_3$ film is preferably an amorphous tungsten oxide film formed through the use of evaporation technique or spattering technique. The thickness of the film is preferably about 1 μm.

In the ECD of FIGS. 1 and 2, the reference electrode 4 functions to detect the potential of the display electrode 2.

Figure 3:
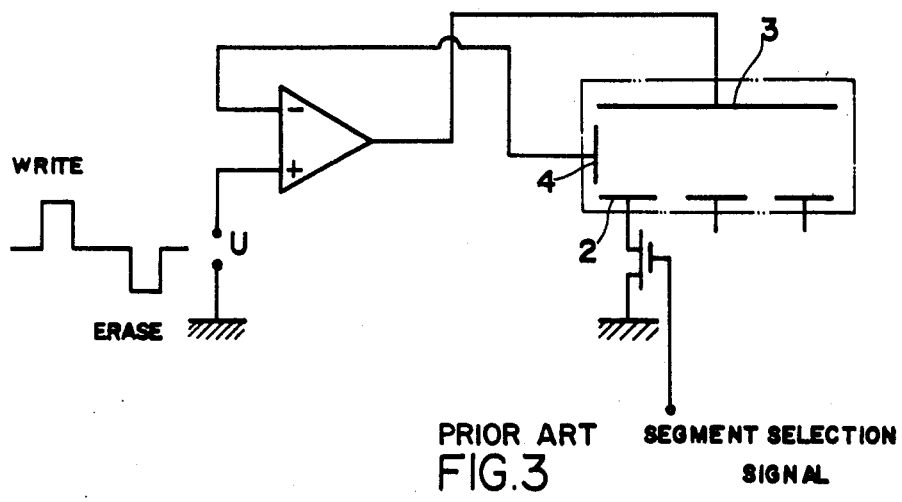
FIG. 3 is a circuit diagram of a typical driver circuit of the constant potential type for ECD.
Figure 4:
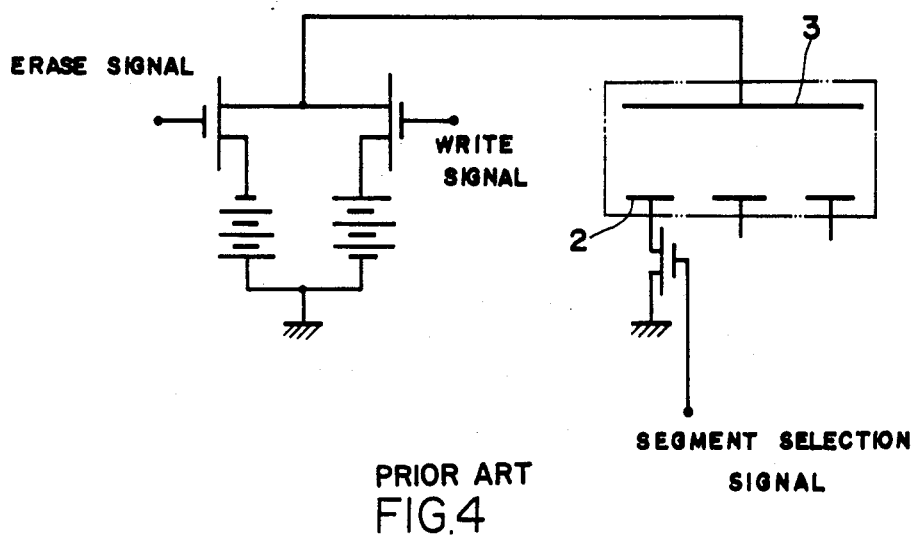
FIG. 4 is a circuit diagram of a typical driver circuit of the constant voltage type for ECD.

FIG. 3 shows an example of a driver circuit of the constant potential type for ECD, wherein the potential difference between the display segment 2 and the reference electrode 4 is maintained at a predetermined level. The current flows from the counter electrode 3 into the electrolyte 8. FIG. 4 shows another example of a driver circuit of the constant voltage type for ECD, wherein the driving voltage is applied directly between the display segment 2 and the counter electrode 3.

Although the operating principle and typical structure of ECDs have been discussed above, ECDs have the following characteristic features:
(1) the viewing angle is extremely wide
(2) contrast is very high and is independent from the viewing angle
(3) low voltage drive (about 1-3 V)
(4) memory effects are expected, which maintains the display state for several hours through several days after the applied voltage is removed
(5) the degree of the coloration is determined by the charge amount flowing therethrough
(6) the power dissipation is proportional to the display area and the number of cycles of coloration/bleaching.

The above-mentioned ECDs are suited for a display device of a battery powered electronic apparatus of the portable type, because the ECDs can operate at a low voltage.

Figure 5:
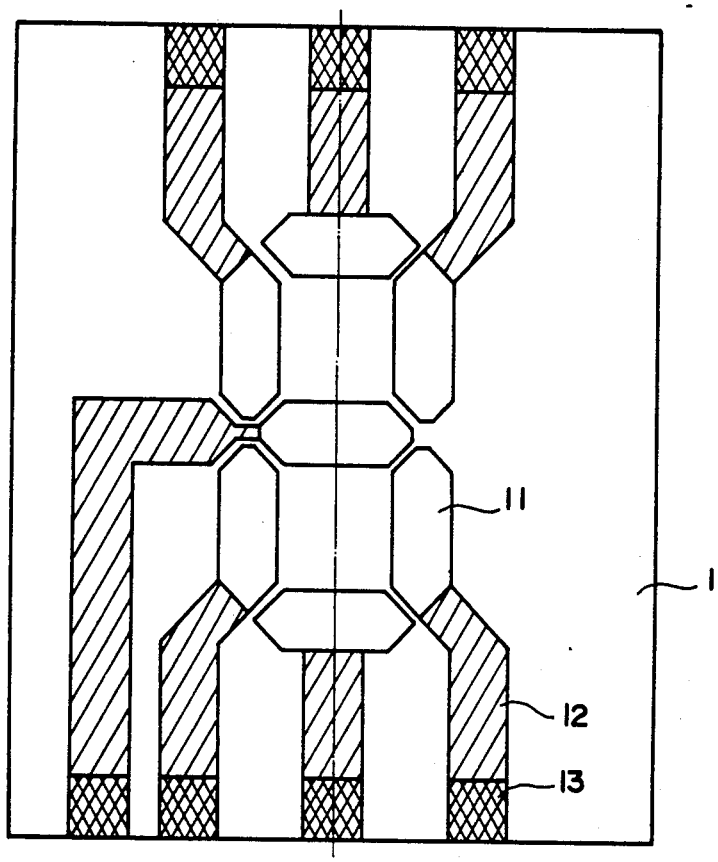
FIG. 5 is a layout of a typical seven-segment numeral display pattern.

Now assume that the ECD is applied to a seven-segment numeral display as shown in FIG. 5. A segment electrode 11 is electrically connected to a terminal 13 formed at the periphery of the glass substrate 1 via a lead-in electrode 12. In such a device, the resistance value of the lead-in electrode 12 greatly influences the visibility.

Figure 6:
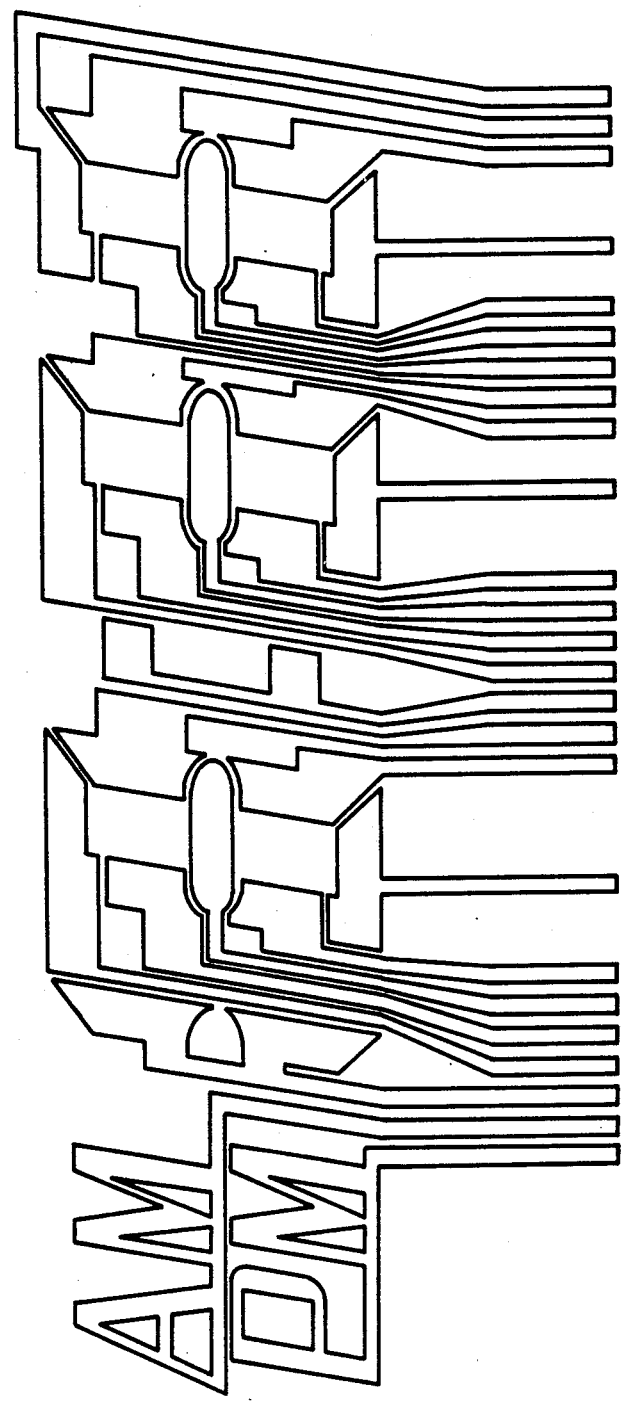
FIG. 6 is a layout of a typical segment pattern of a liquid crystal display device employed within an electronic clock.

In the conventional liquid crystal display device, the liquid crystal layer has a very high impedance. Therefore, the voltage reduction at the transparent lead electrode made of $In_2O_3$ or $SnO_2$ is negligible. Accordingly, the lead-in electrode pattern can be designed in any desired configurations. FIG. 6 shows a typical segment pattern and lead-in electrode pattern of a liquid crystal display device employed within an electronic clock.

However, in the ECDs, a considerably large current flows through the device and, therefore, the voltage reduction becomes not negligible with respect to the driving voltage. The current waveform greatly varies in dependence on the resistance value of the lead electrode.

Figure 7:
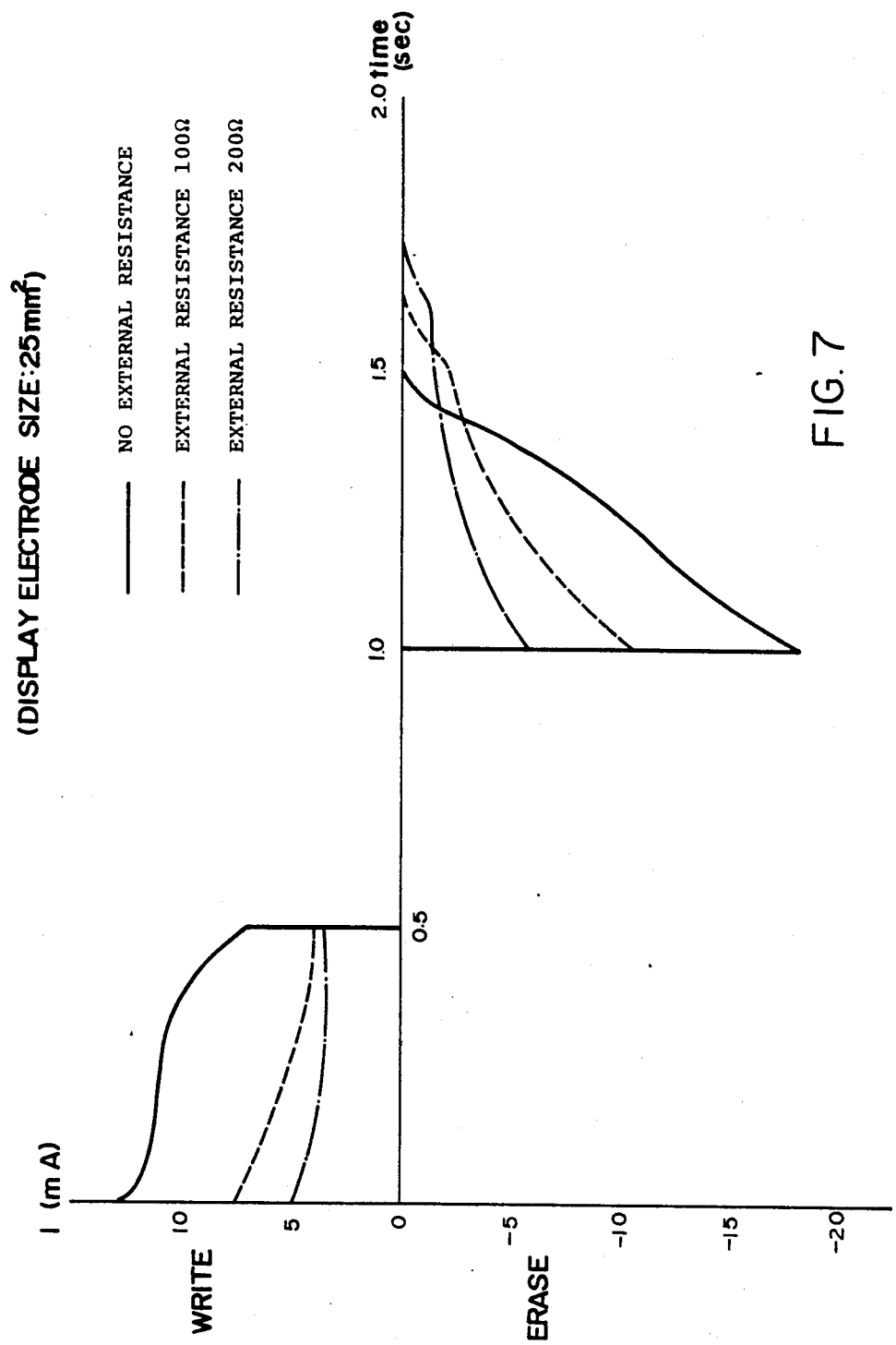
FIG. 7 is a graph showing current versus time period characteristics, the current flowing through the ECD cell during the writing operation and the erasing operation.

FIG. 7 shows current waveforms flowing through the ECD, which has a lead electrode of a very low resistance, driven by the constant potential driver of FIG. 3. FIG. 7 shows that the current waveforms vary when the resistor is serially connected between the display segment and the ground. The response interval (time period required to color the segment to a predetermined degree) becomes longer as the resistance value of the resistor connected to the segment becomes high. Conversely, when the time period during which the drive voltage is applied to the device is fixed, the coloration degree is reduced as the resistance value is increased.

When the display pattern of the ECD is designed in such a manner as shown in FIG. 5, the lengths of the respective lead-in electrodes 12 connecting the segment electrodes 11 to the corresponding terminals 13 are different from each other. In such a system, when the respective lead-in electrodes have a same width, the resistance values of the respective lead-in electrodes are different from each other. This will create variations of the degree of the coloration or variations of the response intervals among the display segments. Such variations are not preferable for clean display.

Figure 8:
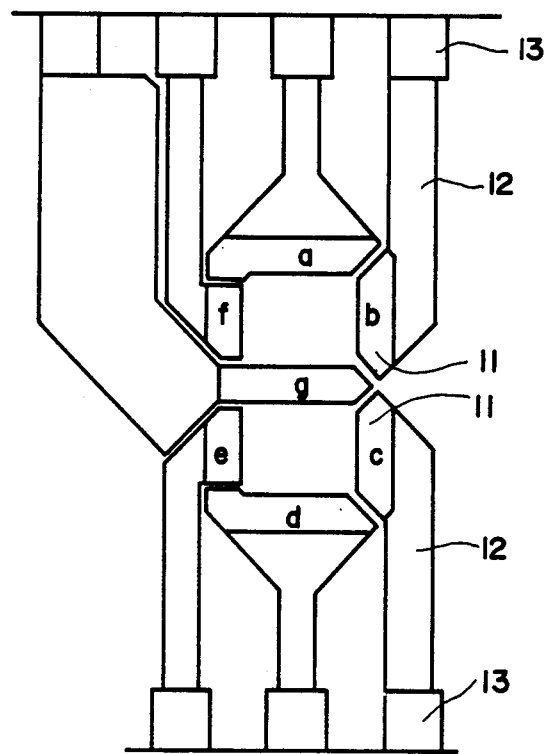
FIG. 8 is a layout of an embodiment of a segment pattern of ECD of the present invention.

FIG. 8 shows another example of the segment pattern, wherein every segment electrode does not have a same size to enhance the quality of the character configuration displayed by the ECD. In this case, the current amount varies depending on the size of the display segment even when the respective lead-in electrodes are formed to have the same resistance.

A preferred example is as follows:

A transparent conductive film made of $In_2O_3$ is formed on a substrate made of soda glass to a thickness of 2000 Å through the use of the electron beam evaporation technique. The surface resistance of the film is 20 Ω/sq. A $WO_3$ film is formed on the transparent conductive film through the use of the conventional evaporation method, the $WO_3$ film functioning as the EC material. The evaporation condition is as follows: A substrate temperature is 350° C.; the film thickness is 5000Å; the evaporation velocity is 10 Å/sec; and the pressure is $5 \times 10^{-4}$ torr. ($O_2$ leak). Thereafter, segment electrodes 11 (a, b, c, d, e, f and g), and lead-in electrodes 12 are shaped in a configuration as shown in FIG. 8 through the use of the photo etching method.

The respective lead-in electrodes 12 are shaped in such a manner as to have resistance values inversely proportional to the size of the corresponding display segments a through g. More specifically, the size of the display segments a and d is 6.8 mm², the size of the display segments b and c is 4.2 mm², and the size of the display segment g is 6.0 mm². The lead-in electrodes connected to the display segments a and d have the resistance value of about 60 Ω, the lead-in electrodes connected to the display segments b and c have the resistance value of about 100 Ω, and the lead-in electrode connected to the display segment g has the resistance value of about 70Ω.

The most preferable photo resist is AZ-119A, and the developer is AZ-303A (both manufactured by Shipley Co.). The $WO_3$ film is etched through the use of the developer of the photo resist, and the $In_2O_3$ film is etched through the use of a mixture of $FeCl_3$-HCl. The lead-in electrodes 12 not defining the display segments are coated with epoxy resin (for example, R-2401/H-160 by Somal Kogyo KK).

The counter electrode is made of a carbon film (for example, Everyohm No. 30 by Nippon Carbon Co.) formed on the glass substrate. The two glass substrates are attached to each other via a glass spacer 5 of the 1mm thick to form the ECD cell as shown in FIG. 2. The electrolyte includes cellosolve acetate ($CH_3COOC_2H_4OC_2H_5$) and $LiClO_4$ by 1.0 mol/l. $BaSO_4$ is added to the above solution by 1:1 weight ratio to provide white background. The thus formed mixture is kneaded to become a paste, which is impregnated into the ECD cell.

The thus formed ECD cell is driven by the constant potential driver of FIG. 3. The respective display segments a through g are connected in a parallel fashion. When the display segment is held at a potential lower than the reference electrode 4 by 0.8-1.0 V, the charge of 3.36 mc (10 mc/cm$^2$) flows within 200 msec, whereby the display of the contrast ratio higher than 10:1 is achieved. Conversely, when the display segment is held at a potential higher than the reference electrode 4 by 1.0-1.5 V, the charge amount as large as that flowed at the writing operation flows in the counter direction within 200 msec, whereby the display is changed to the noncolored condition. The variations of the response intervals are not detected. The contrast ratio is a ratio of the reflection of the 590 nm wavelength monochromatic light (Shimazu Co. model UV-200).

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electrochromic display device including two substrates, display segments formed on one of said two substrates, a counter electrode formed on the other of said two substrates, and an electrochromic material for coloring said display segments upon receiving a predetermined current or voltage, the improvement comprising:

terminals formed on said one of said two substrates for connecting the electrochromic display device to a driver circuit; and lead-in electrodes for connecting said display segments to corresponding terminals, said lead-in electrodes being shaped in such a manner as to have resistance values inversely proportional to the size of the corresponding display segments.

2. The electrochromic display device of claim 1, wherein the display segments define a seven segmented numeral pattern, and every display segment does not have the same size.

3. The electrochromic display device of claim 1, wherein the lead-in electrodes are made of $In_2O_3$ film.

* * * * *